Feb. 17, 1970 B. DEGAETANO 3,495,837

TOY SOUND-PRODUCING APPARATUS

Filed Aug. 31, 1967

INVENTOR.
BEN DEGAETANO

BY Frank J. Pepe

Agent

United States Patent Office 3,495,837
Patented Feb. 17, 1970

3,495,837

TOY SOUND-PRODUCING APPARATUS

Ben Degaetano, Tarrytown, N.Y., assignor to Continental Research & Development Ltd., Toronto, Ontario, Canada, a company of Canada Filed Aug. 31, 1967, Ser. No. 664,711
Int. Cl. G11b 25/04
U.S. Cl. 274—9 11 Claims

ABSTRACT OF THE DISCLOSURE

A sound-producing apparatus particularly suited for use in inexpensive but rugged toys, amusement devices and advertising novelties having a spirally grooved record disc and an associated pick-up needle carried by a movable arm. The latter carries a cam element and, intermediate the pick-up needle and the cam element, the arm is mounted on the base of the apparatus for pivoting movement across the record disc and for limited rocking movement perpendicular to the base to allow the needle to be raised from the record disc. A cam-actuating member engages the cam element and serves to move the arm so that the pick-up needle is raised from the record disc and swung to a peripheral starting position on the disc without scraping over the disc.

Figures 1, 2:
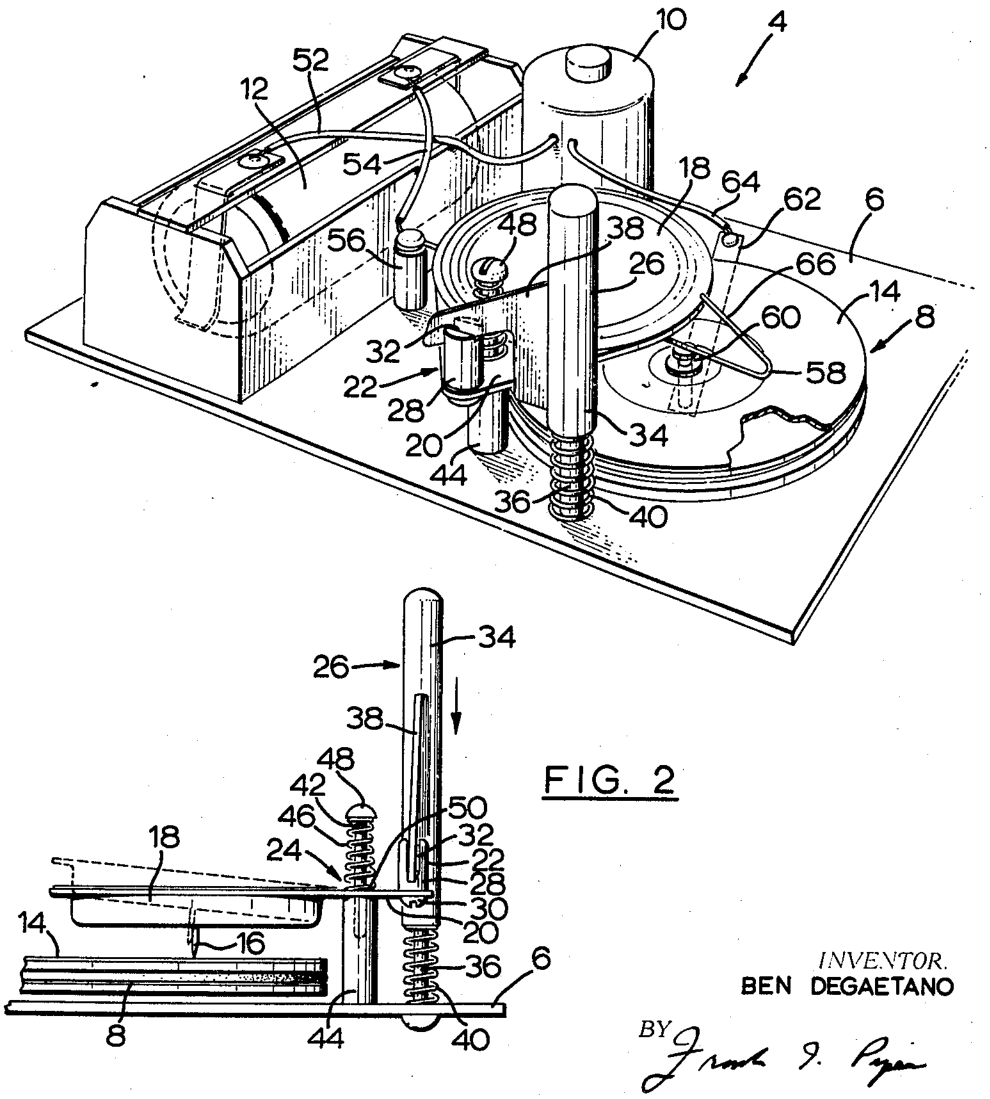

The present invention relates to a sound-producing apparatus suitable for use in toys, amusement devices and advertising novelties. The sound-producing apparatus of the invention can be used, for example, in toys, novelties and devices which, upon actuation, provide for reproduction of one sound track randomly selected from a plurality of sound tracks provided in the apparatus.

In my United States Patent No. 3,222,073, application filed Apr. 1, 1963, I have described and claimed a toy sound-producing apparatus comprising a base element, a spirally grooved disc record mounted to rotate on said base element, means operative to rotate said disc record, a movable arm loosely mounted at one end on said base element for pivotal movement in a generally horizontal direction above said disc record, a pickup needle supported by said arm near its other end, and starting means including a cam element located on the undersurface of said movable arm, said cam element being generally wedge-shaped to effect movement of said pick-up needle to a starting position on said disc record upon upward movement thereagainst of a cam-actuating element, said cam element further being of overall rounded configuration, said starting means further including an elongated cam-actuator member movable upwardly from said base element against said cam element, said actuator member having a rounded head which engages the rounded surface of said cam element for simultaneous lifting and pivoting of said arm to bring said needle to a starting position in a single operation without scraping on said record.

In sound-producing apparatus of the type in question for use in toys, amusement devices and advertising novelties, it is useful to provide the means for actuating the starting device of such an apparatus on an exposed surface of the toy, device or novelty whilst still providing a very positive positioning of the pick-up needle at a starting position on a record disc.

It is accordingly a principal object of the present invention to provide a sound-producing apparatus which may be readily actuated from an exposed surface of a toy, device or novelty in which it is incorporated.

It is a further object of the present invention to provide a very low cost and rugged sound-producing apparatus which can be manufactured simply and inexpensively with a relatively small number of manufacturing and assembly operational steps.

These and other objects of the invention are achieved by the use of a sound-producing apparatus comprising a base, a spirally grooved record disc having at least one generally peripheral starting position and mounted for rotation on said base, means for rotating said record disc, a movable arm carrying a pick-up needle for engagement with said record disc, a cam element being supported on said movable arm and said movable arm being mounted at a pivot on said base intermediate said pick-up needle and said cam element for horizontal pivotal movement across said record disc and for limited vertical rocking movement about said pivot, a cam-actuating member engaging said cam element and reciprocally movable in a vertical direction with respect to said base, and means for normally maintaining said pick-up needle in contact with said record disc, in which apparatus downward movement of said cam-actuating member and consequently of said cam element causes said pick-up needle to be elevated from the surface of said record disc and to be pivoted across said record disc to a generally peripheral starting position of said record disc without scraping on said record disc.

In a particularly useful construction for the apparatus of the invention, the aforementioned cam-actuating member comprises a generally vertical cylindrical member having a radially outwardly and downwardly extending cam arm, the lower surface of which engages the cam element. In such a construction, the cam element may conveniently be provided in the form of a generally vertical stud having a generally vertical slot provided in its upper end for receiving the cam arm of the cam-actuating member. In such a construction, the horizontal width of such a slot may be made sufficiently wide to permit free vertical movement of the cam arm therein irrespective of the position of the pick-up needle on the record disc. Alternatively, such free vertical movement of the cam arm can be ensured by rotatably mounting the aforementioned generally vertical stud on the movable arm for the purpose of allowing it to follow movement of the cam arm of the cam-actuating member.

When the cam-actuating member comprises a generally vertical cylindrical member, it is particularly preferred to mount the latter rotatably on a generally vertical pin extending upwardly from the base of the apparatus and to provide a helical compression spring on such a pin to urge such generally vertical cylindrical member upwardly along the pin. In such a construction, the lower surface of the generally vertical slot in the stud of the cam element is preferably substantially parallel to the lower edge surface of the cam arm.

The movable arm can usefully be mounted on the base of the apparatus by means of a generally vertical generally cylindrical pivot pin secured to the base and extending through a hole provided in said movable arm. In such a construction, the hole in the movable arm will be sufficiently large to permit the required vertical rocking movement of the movable arm.

Most satisfactory results have been obtained by the use of an apparatus in which the movable arm is in a substantially horizontal position when the pick-up needle is in contact with the record disc and the arm can be urged into such a normal horizontal position by means of a helical compression spring co-axial with the aforementioned pivot pin and acting downwardly on the upper surface of the movable arm.

The invention will now be described merely by way of illustration with reference to the accompanying drawings in which:

FIG. 1 is a perspective view of a sound-producing apparatus in accordance with the present invention; and FIG. 2 is a fragmentary vertical sectional view through the pick-up needle of the sound-producing apparatus of FIG. 1 showing how the needle is mounted therein.

The sound-producing apparatus generally indicated at 4 in FIG. 1 of the drawings comprises a base 6 upon which a turntable 8 is mounted for rotation. A drive means such as electrical motor 10 is also mounted on the base 6 for rotating the turntable 8. Any convenient means, such as a rubber band belt drive (not shown), may be used to transfer the motive power from the motor 10 to the turntable 8. An electrical power source such as battery 12 is also supported on the base 6 for providing electrical power for the motor 10.

A record disc 14 is securely mounted on the turntable 8 for rotation therewith. The record disc 14 is provided with one or more inwardly spirally grooves (not shown) having internal surfaces irregularities corresponding to the acoustical vibrations or sounds to be produced by the apparatus. Each of these spiral grooves has a generally peripheral starting position and a generally axial finishing position. The spiralled grooves act as guides for a pick-up needle 16 while the irregularities therein cause the needle to vibrate a sound-producing diaphragm in the usual manner. While the sound-production mechanism in the apparatus of the present invention is similar to that of conventional mechanical record-playing devices, the apparatus of the present invention is adapted for toys, amusement devices and advertising novelties, for example, toy telephones, toy banks and the like, in that the various grooves are somewhat deeper and more rugged than are the grooves in conventional record discs. In addition, the record discs used in the apparatus of the invention are only about three inches in diameter and are frequently provided with several interspersed but independent sound tracks or grooves so that different sound sequences may be produced on different playings of the record disc as will be more fully explained hereinafter.

It will be seen from FIG. 2 that the pick-up needle 16 is mounted in a speaker unit 18 of any suitable construction which in turn is carried by a movable arm 20 on which a cam element generally indicated at 22 is supported. The movable arm 20 is mounted at a pivot generally indicated at 24 on the base 6 at a position intermediate the pick-up needle 16 and the cam element 22 for horizontal pivotal movement across the record disc 14 and for limited vertical rocking movement about the pivot 24 as will be more fully explained hereinafter. A cam-actuating member generally indicated at 26, which is reciprocally movable in a vertical direction with respect to the base 6 and which engages the cam element 22, is also mounted on the base 6.

In the embodiment shown in the drawings, the cam element 22 comprises a generally vertical stud 28 secured at 30 to the movable arm 20 and provided at its upper end with a generally vertical slot 32. The cam-actuating member 26 comprises a generally vertical cylindrical member 34 mounted for rotational movement about and vertical movement along a pin 36 secured to or provided integrally with the base 6. The cylindrical member 34 is provided with a radially outwardly and downwardly extending cam arm 38 which is received within the slot 32 of the cam element 22. A helical compression spring 40 is provided co-axially about the pin 36 to urge the cylindrical member 34 upwardly along the pin 36.

The movable arm 20 is pivoted at 24 by means of a pivot pin 42 carried by a supporting stud 44 secured to or provided integrally with the base 6. The pivot pin 42 passes through a generally circular hole provided in the movable arm 20. This hole has a diameter sufficiently larger than the daimeter of the pivot pin 42 to permit sufficient vertical rocking movement of the arm 20 about the pivot 24. It will be appreciated that the hole need not be circular and can have any other convenient shape.

It will be seen that, for the solid line position of FIG. 2, when the pick-up needle is contact with the record disc 14, the movable arm 20 is in a generally horizontal positoin. The arm 20 is normally maintained in this position by means of a helical compression spring 46 provided co-axially about pivot pin 42 and acting downwardly on the upper surface of arm 20. The spring 46 is retained on pivot pin 42 by means of an enlarged upper end cap 48. The upper end 50 of stud 44 will of course normally be provided with a generally horizontal surface to provide a horizontal seating for arm 20 to ensure that the arm 20 normally adopts the preferred generally horizontal disposition.

The cylindrical member 34 of the cam-actuating member 26 can be of any convenient length so that it can, if desired, project through a hole provided for this purpose in the casing of the toy, amusement device or advertising novelty in which the sound-producing apparatus is incorporated. Alternatively, the sound-producing apparatus may be incorporated in a toy, device or novelty so that the apparatus is actuated in any other appropriate manner, for example, by the insertion of a coin or token into a toy bank.

Electrical power may be transferred from the battery 12 to the motor 10 in any convenient manner, for example in the manner described in my United States Patent No. 3,222,073. In the embodiment shown in the drawings, one terminal of the battery 12 is connected directly to the motor 10 by conductor wire 52. The second terminal of the battery 12 is connected by conductor wire 54 to a terminal post 56 to which a spring wire electrode 58 is connected. The battery-motor circuit is completed by contact of spring wire electrode 58 with a metallic rivet 60 passing upwardly through the centre of the turntable 8 and the record disc 14 and connected at its lower end through a conducting strip 62 and a conducting wire 64 to the other terminal of the motor 10. It will be noted that the spring wire electrode 58 is bent upwardly at an angle to form an engaging portion 66 which lies in the path of the speaker unit 18. The location and the angle of the engaging portion 66 of the spring wire electrode 58 are such that, when the pick-up needle reaches an end of play position near the centre of the record disc 14, the leading edge of the speaker unit 18 will contact the engaging portion 66 causing the spring wire electrode 58 to be raised so breaking the electrical contact of the latter with rivet 60 to open the circuit between the battery 12 and the motor 10 and thus to stop rotation of the record disc 14.

As hereinbefore indicated, the pin 36 and the stud 44 may be provided integrally with the base 6, for instance, by a stamping or moulding operation. Many other components, such as the supports for the battery and the motor may also be provided in a unitary structure with the base thereby further simplifying the manufacturing operation and reducing the cost of the apparatus.

In use, the sound-producing apparatus is actuated by the application of a downward movement to the generally vertical cylindrical member 34 of the cam-actuating member 26 against the action of helical compression spring 40. This downward movement of the cam-actuating member 26 can be obtained simply by pressing down on the top of the cylindrical member 34 or by any other suitable system of levers or controls. Such movement is transmitted through the cam arm 38 to the vertical stud 28 of the cam element 22 causing the movable arm 20 to rock or pivot in a vertical plane about pivot 24. This rocking movement causes the pick-up needle to be elevated from the record disc 14 as shown in broken lines in FIG. 2. A further result of the downward pressure of cam arm 38 on cam element 22 is that the movable arm 20 is pivoted horizontally about pivot 24 so that the pick-up needle 16 is moved radially outwardly to the periphery of the record disc 14.

It should be explained that the arm 20 pivots horizontally about pivot 24 on mere downward pressure of cam arm 38 on cam stud 28 simply and only due to such downward movement of member 34. The sloping undersurface of cam arm 38 is in effect "wedge-shaped," i.e. it slopes, and, therefore, when moved downwardly against stud 28, it causes the desired pivoting movement of the arm 20 about pivot point 24. Since the force applied to the stud 28 by the arm 38 when the member 34 is moved downwardly against the action of spring 40 will be directed perpendicularly and outwardly from the undersurface of arm 38, this force can be resolved into a vertically downwardly directed component and a horizontal component directed towards the right-hand side of FIGURE 1. The downwardly directed component of the force is the force which causes the arm 20 to rock vertically about the pivot 24 and so to cause the pick-up needle to be raised from the record disc. The horizontal component of the total force is the force which causes the arm 20 to pivot horizontally about the pivot point 24. It will be further understood that the arm 20 must be rotatably mounted on the pivot point 24 to permit it to pivot thereabout.

A stop or abutment member (not shown) will generally be provided to prevent further radially outward movement of the pick-up needle 16 beyond the periphery of the record disc 14. Such radially outward movement of the speaker unit 18 to the periphery of the record disc 14 will release the spring wire electrode 58 and allow it to close the battery motor circuit causing the motor to rotate the turntable 8. When the downward pressure on the cylindrical member 34 is released, the latter will move vertically upwardly to its original position under the influence of compression spring 40. In addition, movable arm 20 will pivot vertically under the influence of compression spring 46 to its normal horizontal position as shown in unbroken lines in FIG. 2 and the pick-up needle 16 will engage the upper surface of the record disc 14 at a peripheral starting position. If the record disc is one provided with a plurality of interspersed sound tracks or grooves, the particular groove engaged by the pick-up needle will be determined by the rotational position of the record disc 14. In this way, a completely random selection from the available sound tracks is obtained. Upon continued rotation of the turntable 8 and the record disc 14, the pick-up needle 16 will be guided radially inwardly across the record disc pivoting at pivot 24 until the speaker unit engages the spring wire electrode 58 and raises the latter to open the battery-motor circuit and so stop rotation of the turntable 8.

For particularly effective operation, it is preferred to form the base of the slot 32 with a slope parallel to that of the lower edge of the cam arm 38. It will further be appreciated that, during horizontal pivoting movement of the movable arm 20 about pivot 24, the horizontal angle between movable arm 20 and cam arm 38 will vary. In order to ensure free vertical movement of the cam arm 38 in the slot 32, the latter may be made slightly wider than the thickness of the cam arm 38. Alternatively, the stud 28 in which slot 32 is provided can be secured to the movable arm 20 in such a way as to permit free rotation of the stud about its vertical axis.

It will be seen that the invention provides a very sturdy and dependable simple low cost sound-producing apparatus which is suitable for use in many toys, amusement devices and advertising novelties.

What is claimed is:

1. A sound-producing apparatus comprising a base, a spirally grooved record disc having at least one generally peripheral starting position and mounted for rotation on said base, means for rotating said record disc, a movable arm carrying a pick-up needle for engagement with said record disc, a cam element comprising a stud having a slot provided in its upper end, said stud being supported on said movable arm and said movable arm being mounted at a pivot on said base intermediate said pick-up needle and said stud for pivotal movement of said movable arm across said record disc and for limited rocking movement of said movable arm perpendicularly to said base about said pivot, a cam-actuating member comprising a generally cylindrical member having a cam arm with a radially outwardly extending undersurface, said cam arm being received within said slot in said stud, said generally cylindrical member being reciprocally movable in a direction generally perpendicular to said base, said undersurface of said cam arm engaging a co-operating surface of said slot in said stud, and at least one of said undersurface of said cam arm and said co-operating surface of said slot having a slope relative to said base, and means for normally maintaining said pick-up needle in contact with said record disc, in which sound-producing apparatus movement of said cam-actuating member and consequently of said cam arm and said stud towards said base causes said pick-up needle to be elevated from said record disc and engagement of said cam arm and said stud causes said pick-up needle to be pivoted across said record disc to a generally peripheral starting position of said record disc without scraping on said record disc.

2. A sound-producing apparatus as claimed in claim 1 in which said cam arm has a radially outwardly and downwardly extending undersurface which engages said co-operating surface of said slot in said stud.

3. A sound-producing apparatus as claimed in claim 1 in which said slot in said stud has a sufficient width to permit free movement of said cam arm therein irrespective of the position of said pick-up needle on said disc.

4. A sound-producing apparatus as claimed in claim 1 in which said generally cylindrical member of said cam-actuating member is rotatably mounted on a pin extending perpendicularly upwardly from said base, in which a helical compression spring is provided on said pin to urge said generally cylindrical member upwardly along said pin, and in which the lower internal surface of said slot in said stud is substantially parallel to said under-edge surface of said cam arm.

5. A sound-producing apparatus as claimed in claim 4 in which said pin is formed integrally with said base.

6. A sound-producing apparatus as claimed in claim 5 in which said movable arm is mounted on said base by means of a generally cylindrical pivot pin integrally formed with said base and extending perpendicularly from said base through a hole in said movable arm, said hole in said movable arm being sufficiently large to permit the required rocking movement of said movable arm.

7. A sound-producing apparatus as claimed in claim 6 in which a helical compression spring co-axial with said pivot pin acts on the upper surface of said movable arm normally to maintain said pick-up needle in contact with said record disc.

8. A toy, amusement device or advertising novelty incorporating a sound-producing apparatus as claimed in claim 1 and in which said cam-actuating member can be actuated from outside the casing of said toy, device or novelty.

9. A toy, amusement device or advertising novelty incorporating a sound-producing apparatus as claimed in claim 4 and in which said generally cylindrical member forming said cam-actuating member can be actuated from outside the casing of said toy, device or novelty.

10. A toy, amusement device or advertising novelty incorporating a sound-producing apparatus as claimed in claim 7 and in which said cam-actuating member extends through the casing of said toy, device or novelty to permit it to be readily actuated from without.

11. A sound-producing apparatus as claimed in claim 1 in which said stud forming said cam element is rotatably mounted on said movable arm to permit said slot in said stud to rotate for the purpose of following movement of said cam arm of said cam-actuating member.

References Cited

UNITED STATES PATENTS

| | | | |
|---|---|---|---|
| 3,222,073 | 12/1965 | Degaetano | 274—9 |
| 2,893,738 | 7/1959 | Kent | 274—9 |
| 2,866,646 | 12/1958 | Kindred | 274—9 |

LEONARD FORMAN, Primary Examiner

R. A. FIELDS, Assistant Examiner